(No Model.)

F. G. BURLEY.
BICYCLE SADDLE.

No. 326,946. Patented Sept. 29, 1885.

Witnesses:
Lauritz N. Möller.
John R. Snow.

Inventor,
Franklin G. Burley,
by J. E. Maynadier
Attorney.

N. PETERS. Photo-Lithographer, Washington, D. C.

UNITED STATES PATENT OFFICE.

FRANKLIN G. BURLEY, OF BOSTON, MASSACHUSETTS.

BICYCLE-SADDLE.

SPECIFICATION forming part of Letters Patent No. 326,946, dated September 29, 1885.

Application filed January 7, 1884. (No model.)

*To all whom it may concern:*

Be it known that I, FRANKLIN G. BURLEY, of Boston, in the county of Suffolk and State of Massachusetts, have invented certain new and useful Improvements in Bicycle-Saddles, of which the following is a specification.

My invention relates to improvements in bicycle-saddles which are detachably secured and in which a flexible seat is attached at front and rear to a frame.

The objects of my invention are to provide means for attaching the seat to the frame of the saddle and the saddle to its support, by which the slack of the seat may be taken up, the seat be evenly supported, and the main bar of the frame be made with less material and labor.

My invention consists in the combination, with a flexible seat and its supporting-frame, of a cord connecting the seat and frame by lacing; in the combination, with the saddle-frame and its support, of a clip for holding them together, substantially as hereinafter described, reference being had to the accompanying drawings, in which—

Figure 1:
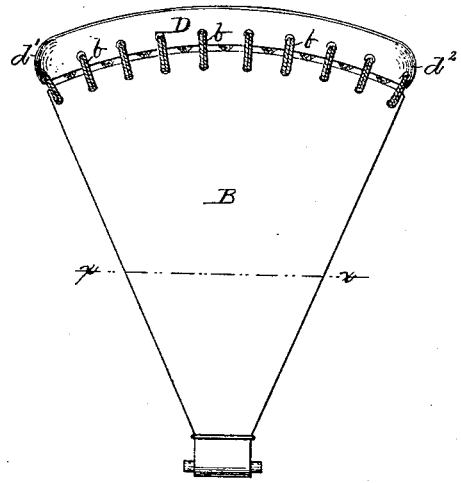
Figure 2:
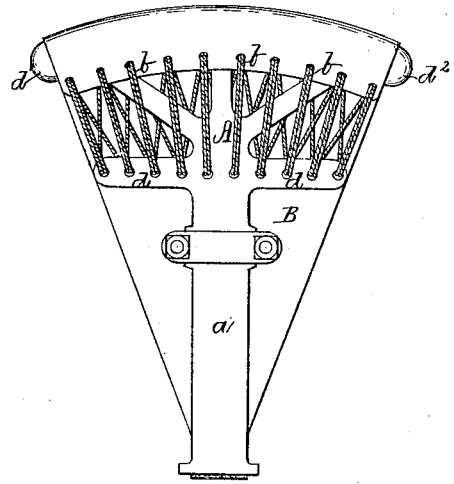
Figure 3:
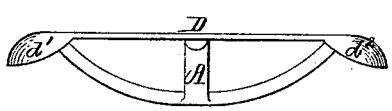
Figure 4:
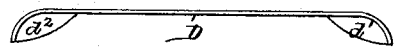
Figure 5:
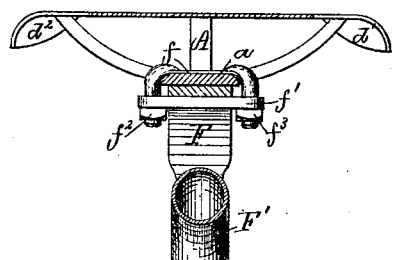

Figure 1 is a top view, showing the seat attached to the rear cross-bar by a lacing-cord. Fig. 2 is a bottom view, showing the seat extending over the rear cross-bar and attached by a cord to the frame. Fig. 3 is a rear view, and Fig. 4 a front view, of the rear cross-bar, showing the curved ends. Fig. 5 is a section on line $x\ x$ of Fig. 1, showing the clip for securing the saddle to the machine.

Heretofore in saddles of this class the flexible seat has been attached to the frame by straps, which were necessarily few in number. In such saddles the space between the straps was not subject to the same tension as the rest of the seat, and the seat was, therefore, rough or ridgy, and uncomfortable for the rider. By attaching the seat by means of lacing-cords the eyelet-holes may be located so as to strain all parts of the seat alike, and thereby keep it smooth and comfortable.

Instead of attaching the saddle by means of bolts passing through holes in the main bar of the saddle-frame, I employ a clip, by means of which the saddle can be readily secured, the expense of making the frame be diminished, and the main bar be made narrower, and thereby be better adapted to prevent any interference with the inside of the leg when extended to the full throw of the crank.

The frame A is preferably substantially that described in my Patent No. 253,504, dated February 14, 1882.

The seat B, of leather or the like, is attached, as shown in Fig. 1, to the frame by means of a lacing-cord, $b$, and eyelet-holes in the seat and in the rear cross-bar, D, through which the cord is alternately passed. Each eyelet-hole forms a bearing for the seat, and when properly arranged produces an even strain on all its parts. Some riders prefer to have the seat extended over the rear cross-bar, as shown in Fig. 2. The eyelets are then best made in a bar, $d$, secured to the under side of the frame; but pins inserted in the under side of the frame may be used in place of the holes to receive the cord.

The rear cross-bar D, is made with enlarged ends $d'\ d^2$, turned down, as shown, to form smooth convex surfaces where the legs, in mounting, are liable to come in contact with them.

The main bar $a$ of the frame is made flat, with parallel sides instead of being widened, to provide room for holding-bolts. The width of the main bar may be the same as that of the spring F, which rests on the perch or backbone F' of the bicycle and provides an elastic support for the saddle. A staple-shaped strap, $f$, which fits over the bar $a$, and a plate, $f'$, through which the ends of the strap $f$ pass, and which bears against the spring F, secure the saddle firmly to the spring when the nuts $f^2\ f^3$ are screwed up.

I do not claim, broadly, a clasp for securing a bicycle-saddle, as such is shown with a saddle having its main bar wedged shape in Patent No. 90,563, dated May 25, 1869.

I claim as my invention—

1. The combination, in a bicycle-saddle, of a flexible seat and the frame with a lacing-cord for attaching the seat to the frame, substantially as and for the purposes set forth.

2. A bicycle-saddle having a straight-sided main bar, in combination with a staple-shaped strap, a plate through which the ends of the strap pass, and nuts for adjusting the plate, substantially as set forth.

F. G. BURLEY.

Witnesses:
G. B. MAYNADIER,
J. R. SNOW.